Oct. 28, 1941.    J. E. LOVELY    2,260,856
RAPID TRAVERSE MECHANISM FOR CARRIAGES AND CROSS SLIDES
Filed July 25, 1939    2 Sheets-Sheet 1
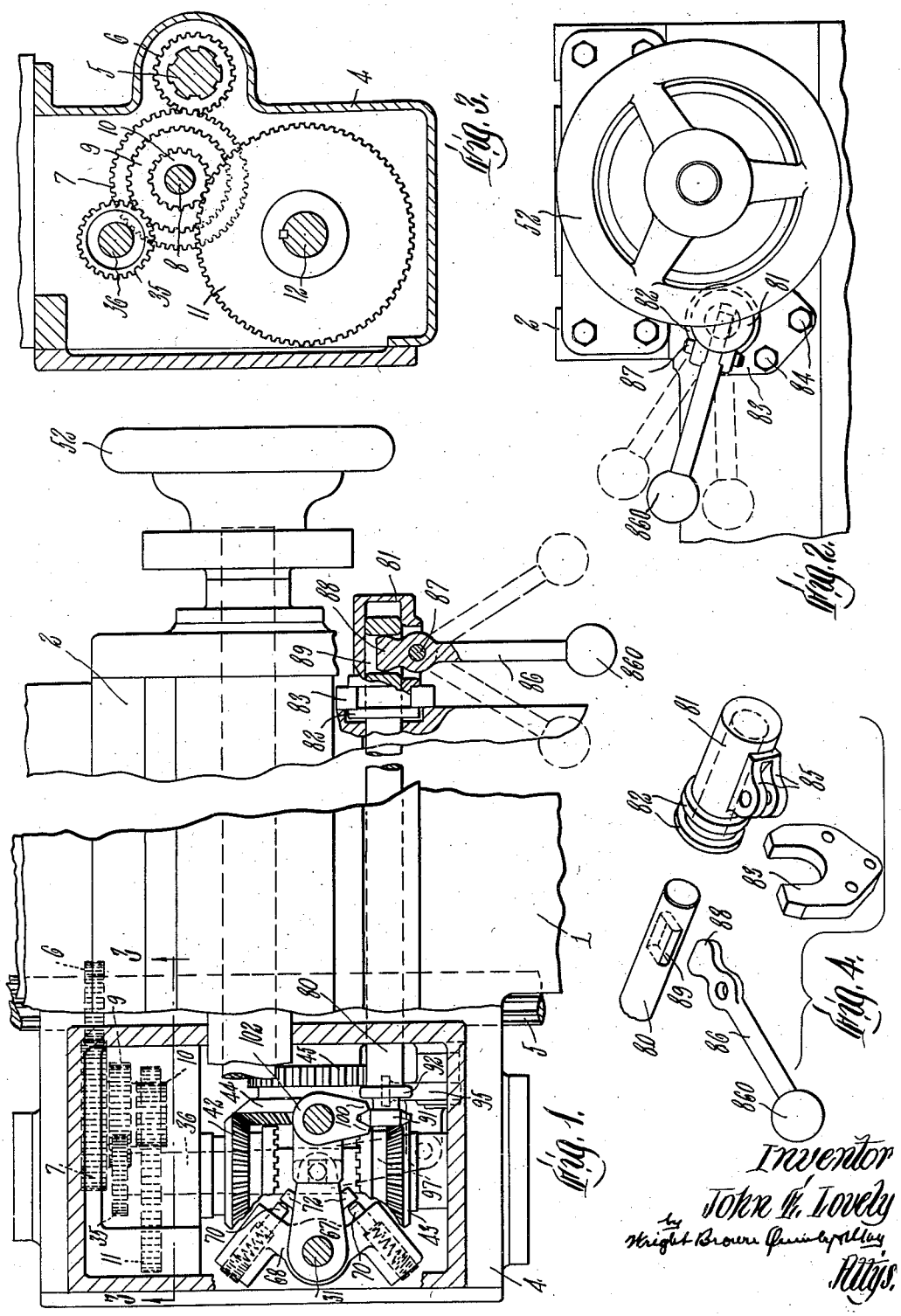
Inventor
John E. Lovely

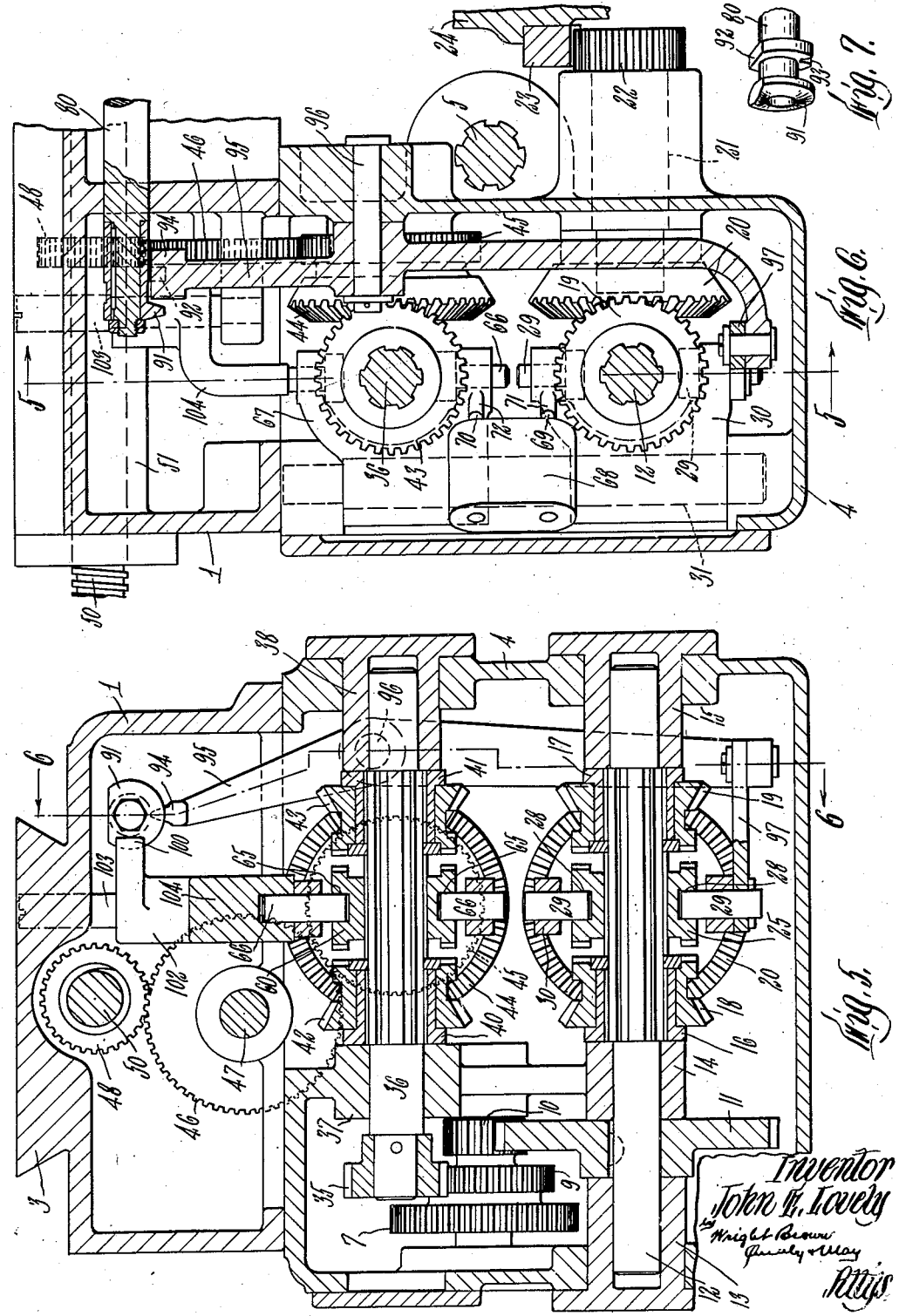

Patented Oct. 28, 1941

2,260,856

UNITED STATES PATENT OFFICE 2,260,856

RAPID TRAVERSE MECHANISM FOR CARRIAGES AND CROSS SLIDES

John E. Lovely, Springfield, Vt., assignor to Jones & Lamson Machine Company, Springfield, Vt., a corporation of Vermont Application July 25, 1939, Serial No. 286,364

7 Claims. (Cl. 82—21)

This invention relates to rapid traverse mechanism for both the carriage and the cross slide of a lathe or the like, and has for an object to control the traverse in opposite directions of both carriage and slide from a single member.

A further object is to provide mechanism by which the motions of the carriage and the slide are controlled each independently of the other and by the use of a single control member.

Another object is to provide a control member movable in two sets of angularly related planes, motion of said member in the planes of one set changing the control of the carriage traverse and motion of the same member in the planes of the other set changing the control of the cross slide motion.

For a more complete understanding of this invention, reference may be had to the accompanying drawings in which Figure 1 is a fragmentary top plan view partly broken away of the forward portion of the cross slide of a lathe embodying this invention.

Figure 2 is a fragmentary front elevation of the same.

Figure 3 is a detail section on line 3—3 of Figure 1.

Figure 4 is an exploded perspective view of the control handle and related parts.

Figure 5 is a cross section on line 5—5 of Figure 6.

Figure 6 is a cross section on line 6—6 of Figure 5.

Figure 7 is a fragmentary perspective of one end portion of the shaft which actuates the reverse mechanisms.

Referring first to Figures 1, 2, 5 and 6, at I is indicated a traversing carriage for a lathe, or the like, which has mounted thereon a cross slide 2. As shown in Figure 5, the top face of the traversing carriage I is provided with a dovetail way 3 for receiving the cross slide 2. Arranged along the side of the lathe bed and extending through a gear box 4 of the carriage is a splined power shaft 5, by the rotation of which both the traversing motion of the carriage and the in and out motion of the cross slide is accomplished through the following connections.

The power shaft 5 has splined thereto a driving gear 6 which is movable along the power shaft 5, but is held against axial movement with respect to the traversing carriage by any suitable means. As shown best in Figure 3, this gear 6 meshes with a gear 7 journaled on a stub shaft 8 and fixed to rotate with the gear 7 are the smaller gears 9 and 10. The gear 10 meshes with a gear 11 keyed to a shaft 12 and this shaft, as shown in Figures 5 and 6, is journaled in suitable bearings 13 and 14 on either side of the gear 11 and in a bearing 15 spaced from the bearing 14. Between the bearings 14 and 15, the shaft 12 is splined and has journaled on sleeves 16 and 17 fixed thereto adjacent to these bearings, a pair of beveled gears 18 and 19. These gears 18 and 19 both mesh with a beveled gear 20 fixed to a shaft 21 (see Figure 6) which extends outwardly through the rear wall of the gear casing and has secured to its rear end a pinion 22. This pinion meshes with a rack 23 fixed to the machine bed 24 so that as the pinion 22 is rotated, the carriage is caused to traverse along the length of the rack 23 and thus lengthwise of the machine bed.

Between the gears 18 and 19 a double face clutch member 25 is mounted for sliding motion axially of the shaft 12 so as to be brought selectively into or out of driving relation to either selected of the gears 18 and 19. This clutch member 25 thus forms part of a reversing mechanism which controls the direction of drive of the pinion 22, there being a neutral position shown in Figure 5 in which the clutch member 25 is out of engagement with both the gears 18 and 19, and in which position rotation of the power shaft 5 is ineffective to move the carriage. The clutch member 25 is provided with a peripheral groove 28 in which may be engaged oppositely disposed shoes 29 carried by the forked extremity of a yoke 30, which is rockable on a shaft 31. Mechanism for rocking this yoke to bring the clutch member 25 into or out of mesh selectively with the clutch faces of the gears 18 and 19 will be later described.

The cross slide is also driven by the power shaft 5, being driven from the gear 9 journaled on the shaft 8. This gear 9 meshes with a pinion 35 fixed to a shaft 36 which is splined like the shaft 12 intermediate to its bearings 37 and 38. This splined portion has secured thereto the bearing sleeves 40 and 41 upon which are journaled the beveled gears 42 and 43, respectively. These gears 42 and 43 mesh with a bevel gear 44 which is provided with a spur gear portion 45 meshing with a gear 46 journaled on a stub shaft 47. This gear 46 meshes in turn with a pinion 48 secured to the cross feed screw 50, which is threaded in a nut 51 secured to the carriage. This cross feed screw 50 is journaled in but held against rotation with respect to the cross slide 2 and may be provided at its outer end with a hand wheel 52 by which it may be manually actuated when desired. Either selected of the beveled gears 42 or 43 may be clutched to be driven by the shaft 36. For this purpose there is shown the sliding double clutch member 60 mounted on the splined portion of the shaft 36 to be rotated thereby and having oppositely disposed clutch faces which may be brought into or out of engagement with mating clutch faces of the gears 42 and 43. This reversing mechanism in so far as the clutch mechanism is concerned is the same as that for the reverse mechanism for the carriage traverse which has already been described.

The clutch member 60 is provided with a peripheral groove 65 for the reception of shoes 66 carried by a yoke member 67 journaled on the shaft 31. Each of the clutch members 25 and 60 is normally held in neutral position out of clutching engagement with both of its cooperating bevel gears and for this purpose a spring centering device 68 may be employed. As shown best in Figure 1, this device 68 comprises a bracket member carried on the shaft 31 between the rocker yokes 30 and 67 and having four spring pressed plungers 69 and 70 riding on bosses 71 and 72 of the yoke members 30 and 67, respectively, so as to tend to hold the reverse mechanisms in neutral position.

Means are provided in accordance with this invention, however, by which the two reverse mechanisms may be actuated so as to selectively drive the carriage and the cross slide in either direction at will, and each independently of the other or simultaneously. To this end, there is provided an axially movable rock shaft 80 mounted in the gear box and extending outwardly through the forward face of the carriage. Outwardly of this forward face it projects into a sleeve 81 which is held against axial motion. The means for so holding it comprises a pair of spaced annular ribs 82 near the rear end of the sleeve 81 between which engages a forked member 83 which may be secured to the forward face of the carriage as by means of bolts 84 (see Figure 2). This mounting of the sleeve 81 permits it to have a rocking motion about its axis, but it confines it against axial motion. It is provided with a pair of spaced lugs 85 between which extends a lever 86 having a handle 860 at its outer end and which is fulcrumed between the lugs 85 as on the fulcrum pin 87. The inner end of the lever 86 is formed with a head 88 which projects into a lateral slot 89 in the outer end portion of the shaft 80. By rocking the outer end of the lever 86 on the fulcrum 87, the shaft 80 may be moved axially, and by rocking the handle 86 in a plane transverse to the axis of the shaft 80, the sleeve 81 is rocked. The head 88 engaging in the slot 89 of the slot 80 acts as a key to prevent relative axial turning movement between the shaft 80 and the sleeve 81 so that rocking motion of the lever 86 about the axis of the sleeve 81 also rocks the shaft 80 therewith.

Means are provided by which the rocking of the shaft 80 actuates one of the reverse mechanisms and the axial motion of this shaft actuates the other reverse mechanism. To this end, the inner end of the shaft 80 is provided with a pair of spaced annular collars 91 and 92. The collar 92 is provided with a slot 93 of a shape similar to that of the space between adjacent teeth of a gear and riding in this slot is a head 94 of gear tooth cross section (see Figures 5 and 6), at one end of a lever 95 fulcrumed by the pin 96 to the gear casing 4.

The lower end of this lever 95 as viewed in Figures 5 and 6 has pivoted thereto a link 97 which is pivoted at its opposite end to the outer end of one of the shoes 29. Thus as the shaft 80 is rocked about its axis the shoe 94 is rocked, this acting to swing the yoke 30 and thus move the clutch member 25. At the intermediate position of the lever 86 shown in full lines in Figure 2, the clutch member 25 will be in neutral position and the carriage will not be traversed, but by moving the lever transverse to the axis of the shaft 80 so as to rock this shaft, the clutch member 27 will be moved into driving relation to one or the other of the gears 18 or 19 so that the rotation of the power shaft 5 will cause traverse in the corresponding direction of the carriage. The outer collar 91 of the shaft 80 of gear tooth section, projects between spaced teeth 100 (see Figures 1 and 5) of a rocker member 102 journaled on a pivot shaft 103 and having an arm 104 engaging over the upper end of the top shoe 66 of the sliding clutch member 60, so that as the shaft 80 is moved axially by rocking of the lever 86 in a plane parallel to the axis of the shaft 80 from the full line position shown in Figure 1 to either of the dotted line positions shown in this figure, the clutch member 60 is shifted into driving engagement with one or the other of the gears 42 or 43 so that motion is imparted through the gear train 45, 46 and 48 to the transverse feed screw thus to drive the cross slide in the corresponding direction.

It will be noted that the controlling handle 860 may be swung in either of two sets of angularly disposed planes, each plane of one set corresponding to the angular position of the handle in a plane of the other set. Thus, in whatever control position it may be turned for neutral or traverse of the carriage in either selected direction, the handle may also be positioned selectively in neutral or for either direction of motion of the cross slide. The control of motion of the carriage and the cross slide are thus quite independent of each other though all are selected by the position of the one handle and both carriage and cross slide may be moved at the same time. As shown upward and downward motion of the handle causes backward and forward motions, respectively, of the cross slide and left or right hand motion of the handle causes motions of the carriage in the corresponding direction.

From the foregoing description of an embodiment of this invention, it should be evident to those skilled in the art that various changes and modifications might be made without departing from the spirit or scope of this invention as defined by the appended claims.

I claim:

1. The combination with a traversing carriage, a cross slide on said carriage, a power shaft, driving connections from said shaft to said cross slide including reversing mechanism, and driving connections from said shaft to said carriage including reversing mechanism, of control mechanism for said connections, including a member mounted for motion in two directions, and operative connections from said member to said reversing mechanisms causing motion of said member in one of said directions to effect the reversing mechanism for said carriage and in the other direction to effect the reversing mechanism for said cross slide.

2. The combination with a traversing carriage, a cross slide on said carriage, a power shaft, driving connections from said shaft to said cross slide including reversing mechanism, and driving connections from said shaft to said carriage including reversing mechanism, of control mechanism for said reversing mechanisms including a shaft mounted for rocking and axial motions, and connections from said rocking shaft causing rocking motion of said rocking shaft to shift one of said reversing mechanisms, and axial motion of said rocking shaft to shift the other of said reversing mechanisms.

3. The combination with a traversing carriage, a cross slide on said carriage, a power shaft, driving connections from said shaft to said cross slide including reversing mechanism, and driving connections from said shaft to said carriage including reversing mechanism, of control mechanism for said reversing mechanisms, including a rock shaft, a sleeve in which said rock shaft is mounted for axial motion, means holding said sleeve against axial motion with said rock shaft, and a hand lever fulcrumed on said sleeve and engaging said rock shaft to cause rocking of said lever on its fulcrum to move said rock shaft axially and rocking of said lever about the axis of said rock shaft to rock said rock shaft, and connections from said rock shaft causing rocking motion of said rock shaft to shift one of said reversing mechanisms and axial motion of said rock shaft to shift the other of said reversing mechanisms.

4. The combination with a traversing carriage, a cross slide on said carriage, a power shaft, driving connections from said shaft to said cross slide including reversing mechanism, and driving connections from said shaft to said carriage including reversing mechanism, a member mounted for rocking motion in a pair of sets of angularly related planes, and connections from said member to said reversing mechanisms causing rocking of said member in a plane of one of said sets to shift one of said reversing mechanisms and motion of said member in a plane of the other sets of planes to shift the other of said reversing mechanisms.

5. The combination with a traversing carriage, a cross slide on said carriage, a power shaft, driving connections from said shaft to said carriage including a double face reversing clutch member shiftable through a neutral position between reverse direction driving positions, driving connections from said shaft to said cross slide including a double face traversing clutch member shiftable through a neutral position between reverse direction driving positions, a shifter for moving each of said clutch members, an axially movable rock shaft having axially spaced collar portions, one of said collar portions having a slot thereacross, an actuating member engageable in said slot for all axial positions of said shaft and movable by the rocking of said rock shaft, an actuating member engageable between said collar portions and movable by the axial motion of said rock shaft, operative connections for each of said actuating members to one of said shifters, and means for rocking and axially moving said rock shaft.

6. The combination with a traversing carriage, a cross slide on said carriage, a power shaft, driving connections from said shaft to said carriage including a double face reversing clutch member shiftable through a neutral position between reverse direction driving positions, driving connections from said shaft to said cross slide including a double face reversing clutch member shiftable through a neutral position between reverse direction driving positions, a shifter for moving each of said clutch members, an axially movable rock shaft having axially spaced collar portions, one of said collar portions having a slot thereacross, an actuating member engageable in said slot for all axial positions of said shaft and movable by the rocking of said rock shaft, an actuating member engageable between said collar portions and movable by the axial motion of said rock shaft, operative connections for each of said actuating members to one of said shifters, and a member connected to said rock shaft for selectively rocking and axially moving said rock shaft.

7. In a machine having a frame, a traversing carriage mounted on said frame, a cross slide on said carriage, and a power shaft, driving connections from said shaft to said carriage including reversing mechanism, driving connections from said shaft to said cross slide including reversing mechanism, control mechanism for said connections including a lever pivotally carried by said frame for up and down and lateral pivotal motions and connections from said lever to said reversing mechanisms causing up and down motion of said lever to control said cross slide reversing mechanism and lateral motion of said lever to control said carriage reversing mechanism.

JOHN E. LOVELY.